May 26, 1925. 1,539,510
T. C. ROBERTS
APPARATUS FOR MOLDING ARTICLES
Filed Aug. 27, 1920 7 Sheets-Sheet 2
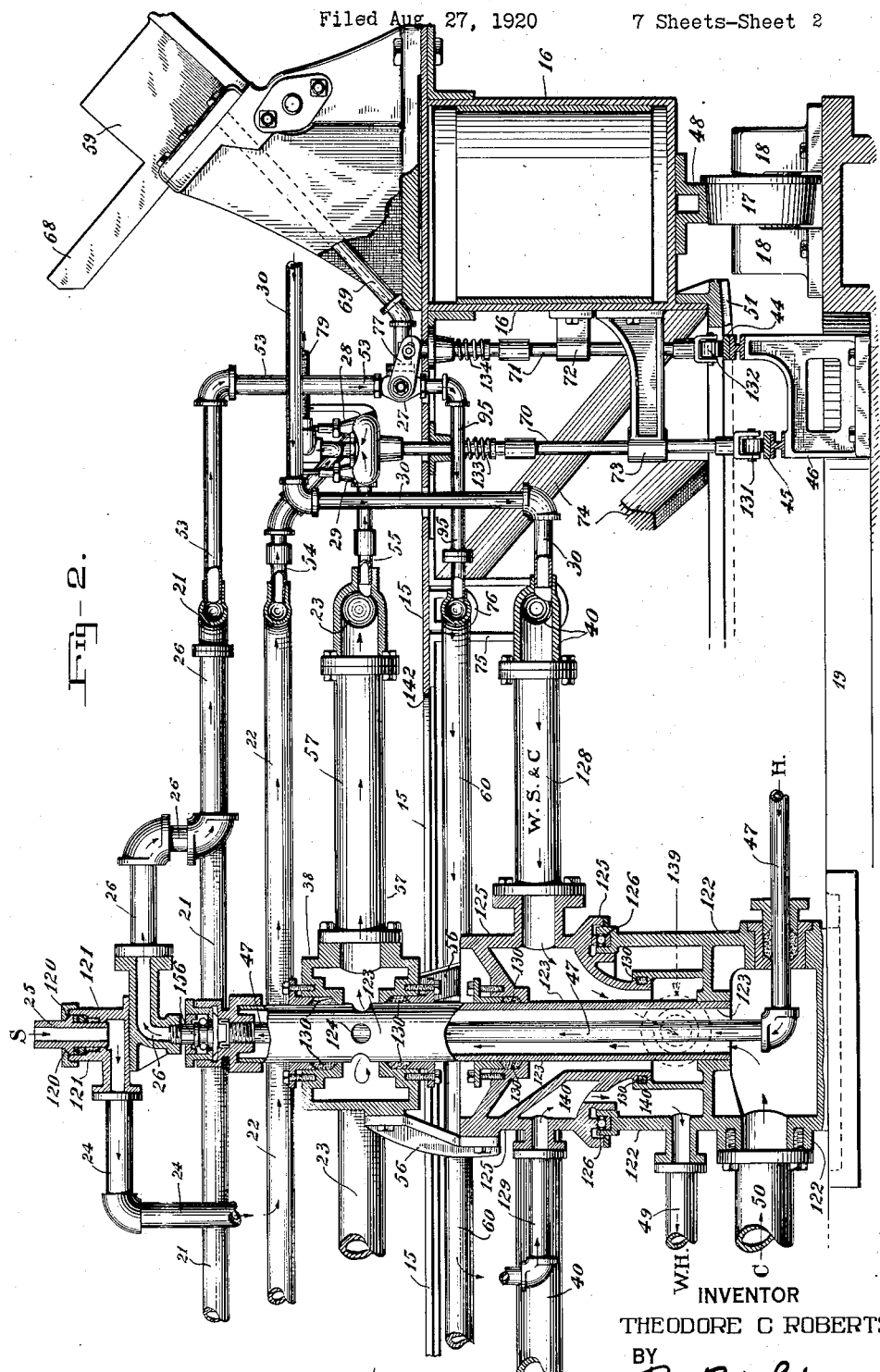
INVENTOR
THEODORE C ROBERTS
BY
Ray B. Whitman
ATTORNEY

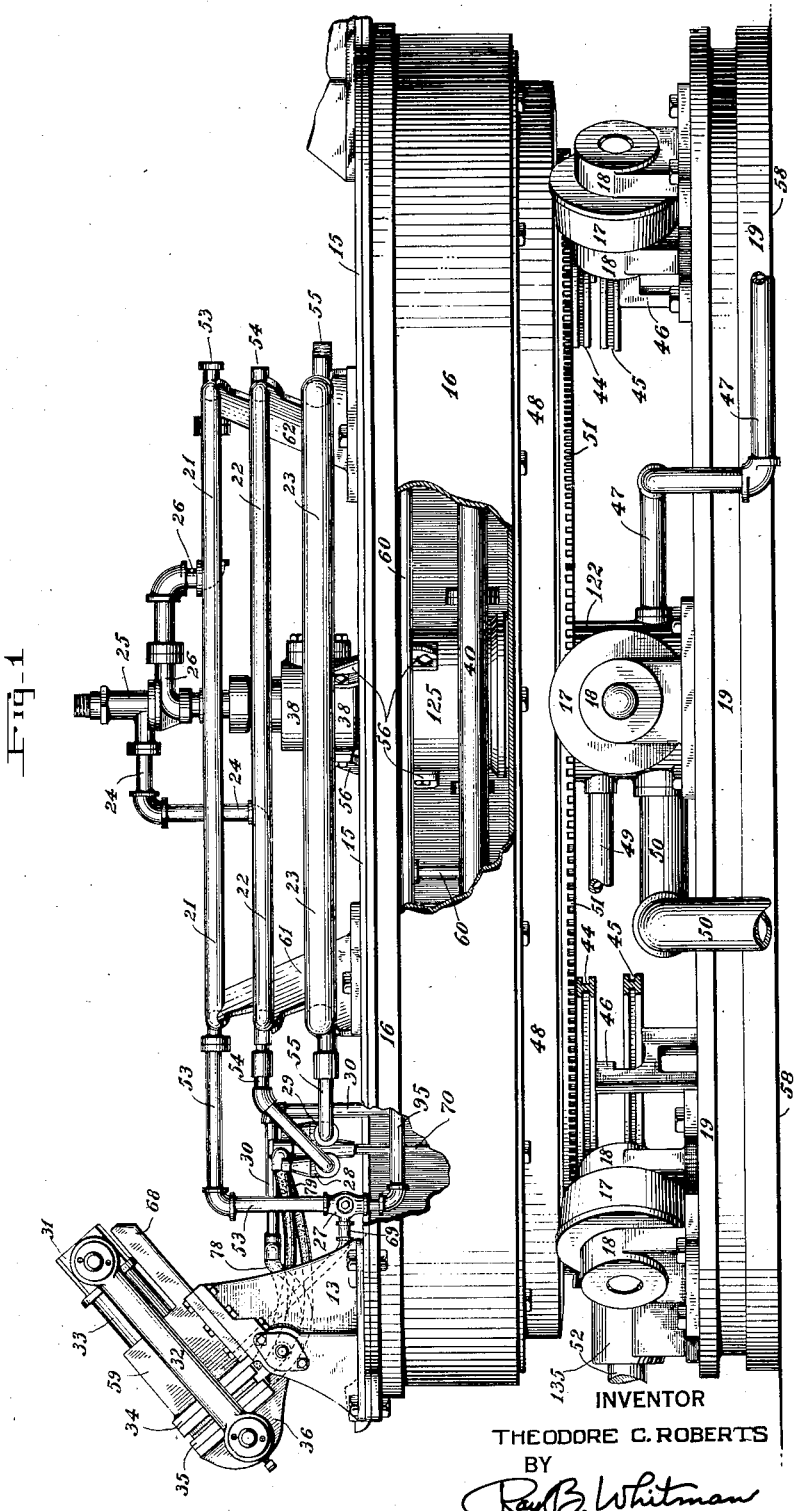

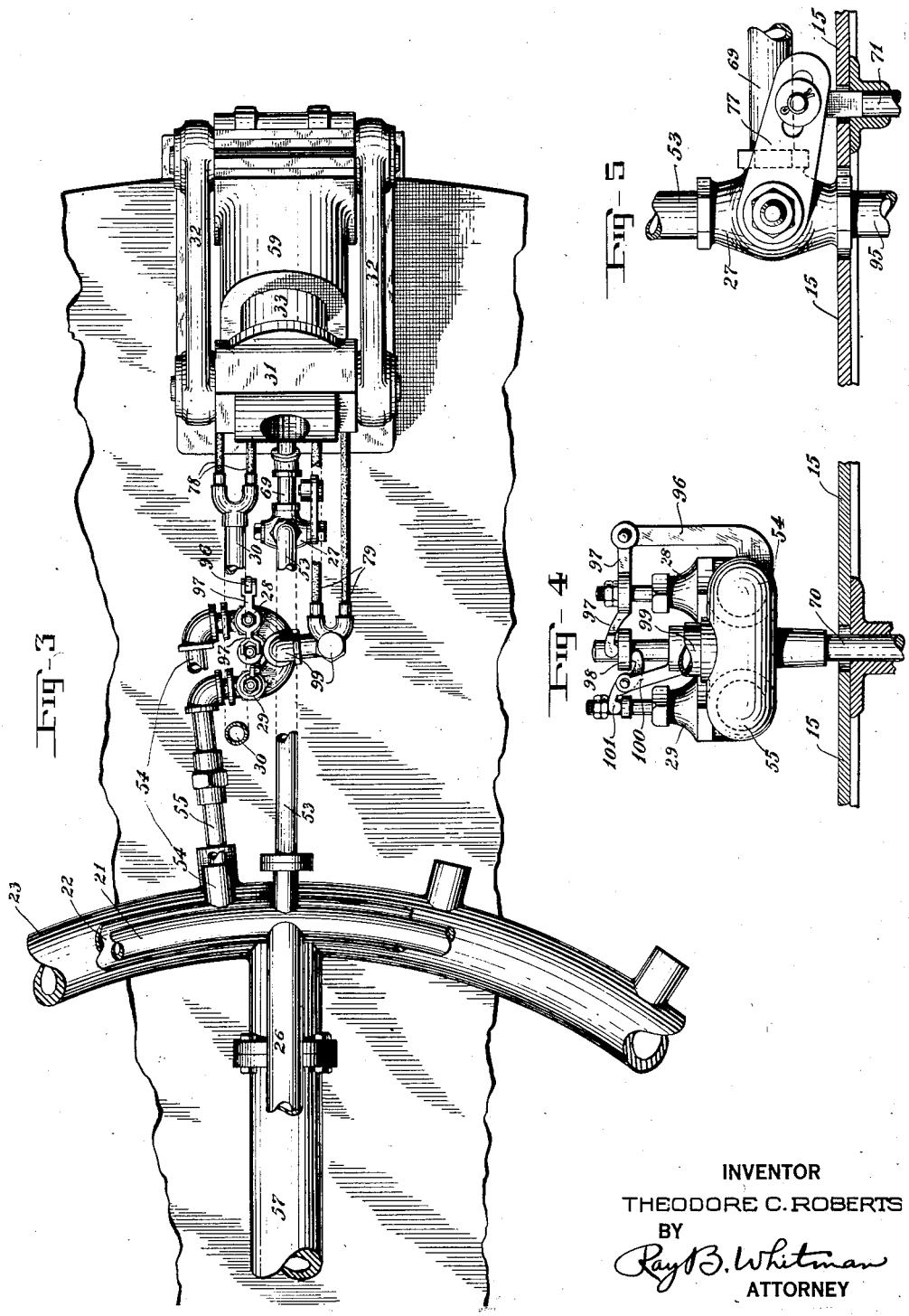

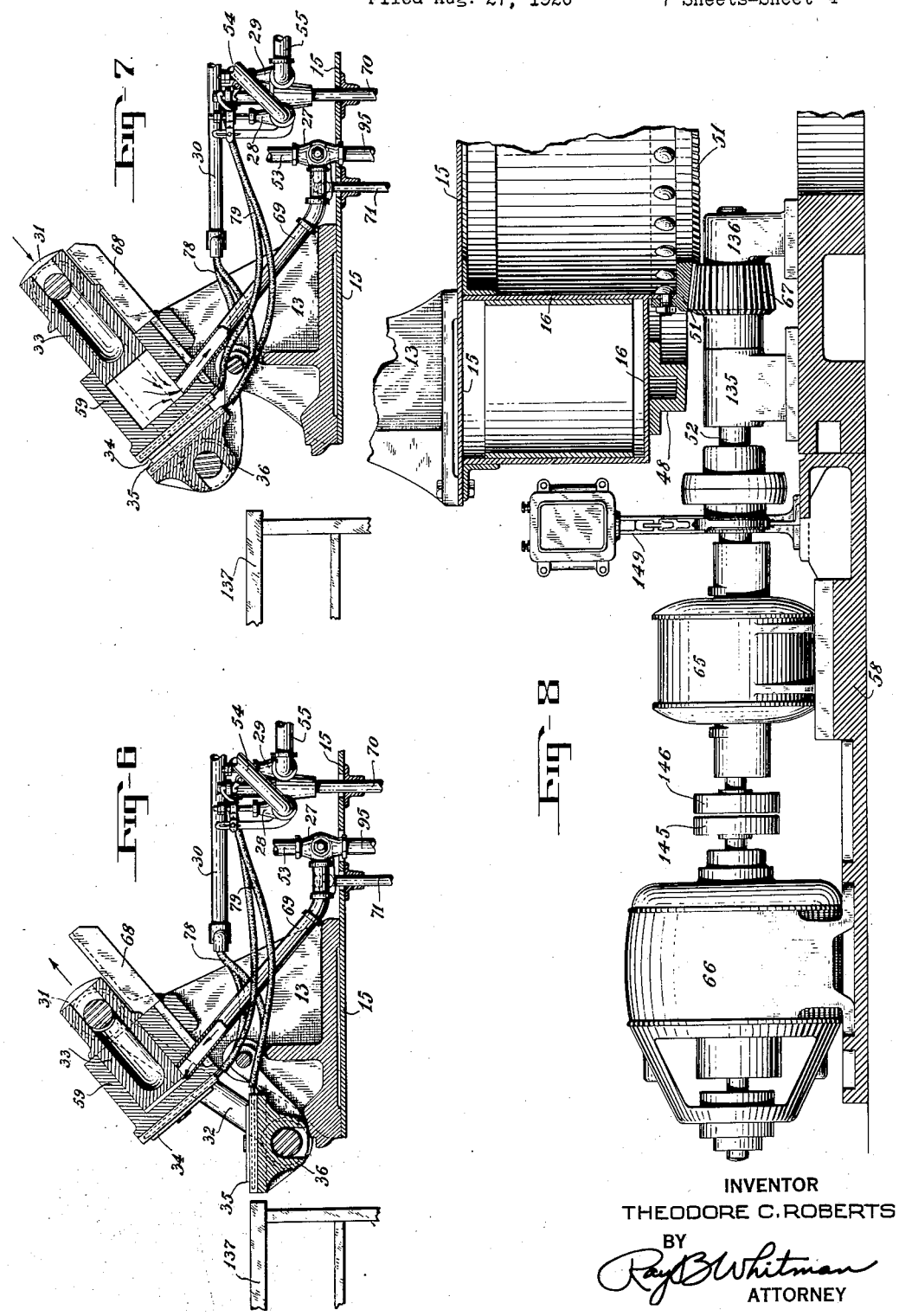

May 26, 1925. 1,539,510
T. C. ROBERTS
APPARATUS FOR MOLDING ARTICLES
Filed Aug. 27, 1920 7 Sheets-Sheet 5
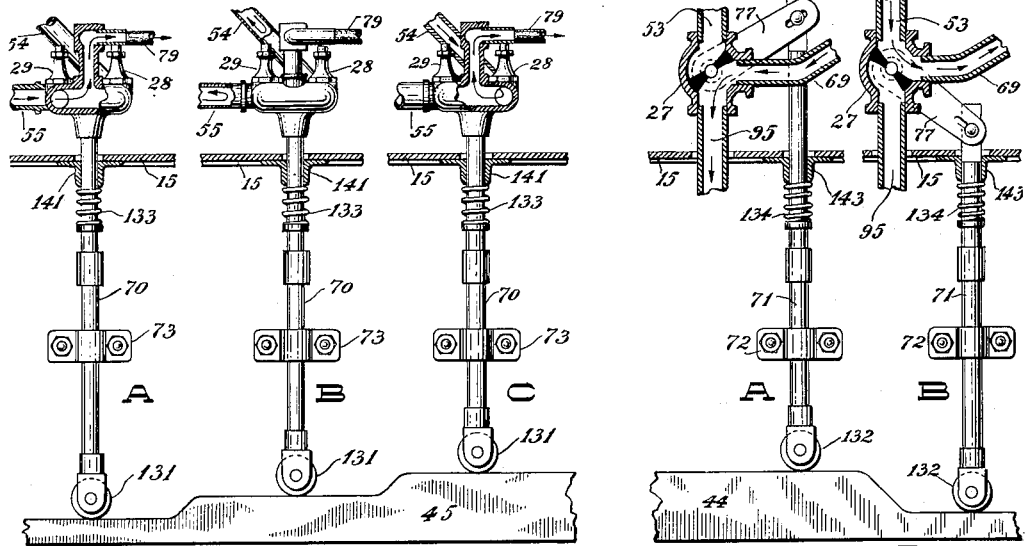
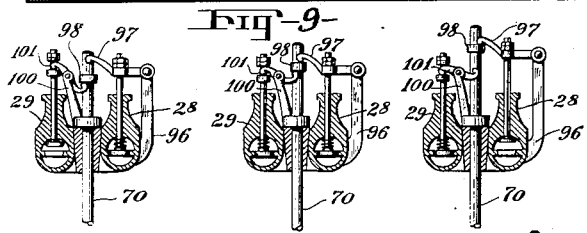
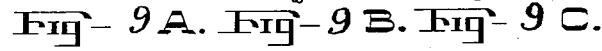
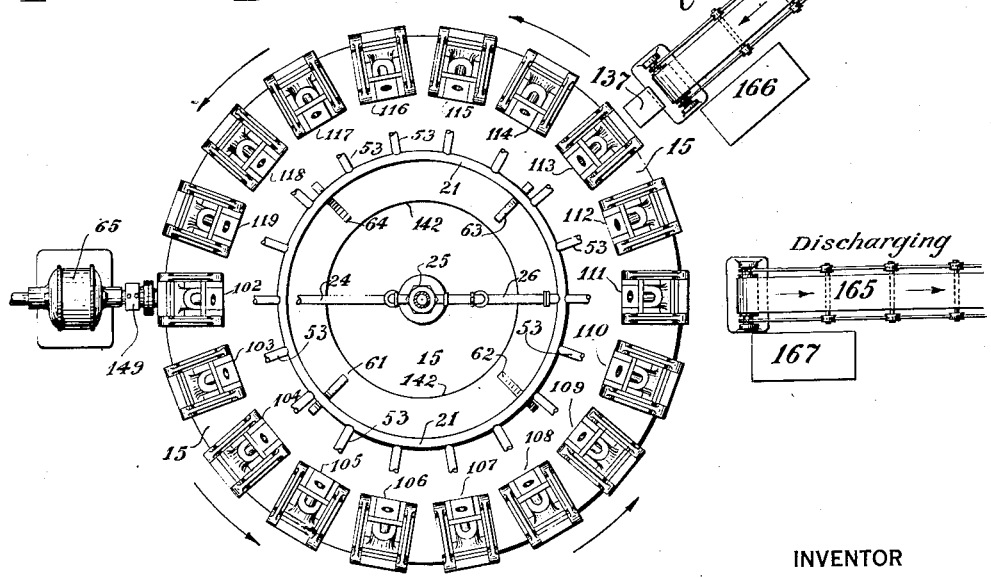
INVENTOR
THEODORE C. ROBERTS
BY
Ray B. Whitman
ATTORNEY May 26, 1925.

T. C. ROBERTS 1,539,510

APPARATUS FOR MOLDING ARTICLES

Filed Aug. 27, 1920

INVENTOR
THEODORE C. ROBERTS
BY
Ray B. Whitman
ATTORNEY

May 26, 1925. 1,539,510
T. C. ROBERTS
APPARATUS FOR MOLDING ARTICLES
Filed Aug. 27, 1920 7 Sheets-Sheet 7

INVENTOR
THEODORE C. ROBERTS
BY
Ray B. Whitman
ATTORNEY

Patented May 26, 1925.

1,539,510

UNITED STATES PATENT OFFICE.

THEODORE C. ROBERTS, OF NEW YORK, N. Y., ASSIGNOR, BY MESNE ASSIGNMENTS, TO COLUMBIA PHONOGRAPH COMPANY, INC., A CORPORATION OF NEW YORK.

APPARATUS FOR MOLDING ARTICLES.

Application filed August 27, 1920. Serial No. 406,450.

*To all whom it may concern:*

Be it known that I, THEODORE C. ROBERTS, a citizen of the United States, and a resident of New York, in the county and State of New York, have invented certain new and useful Improvements in Apparatus for Molding Articles, of which the following, taken in connection with the accompanying drawings, is a specification.

This invention relates to hydraulically operated molding presses, and particularly to presses for manufacturing disc records from plastic material. It also refers to a new and improved method of manufacturing such articles.

It covers an automatically-operated multiple-pressing machine especially adapted to the quantity and quality production of phonograph sound records. It differs from others in the prior art by virtue of the fact that the various steps in the process of manufacture of the product are performed successively and in the one machine, there being a plurality of stations at which the material is treated in its different stages simultaneously. Also, there is a definite and controllable correlation between the treatment performed at any one station and that at the next succeeding station.

Being almost entirely automatic in operation, a machine so organized makes possible the employment of unskilled labor in the major part of the work of making records. Its greatest advantage, however, is the saving of time effected, since the pressing operation can progress at top speed, without the customary delays incident to controlling the operation of the heating and cooling media, and the even greater time-interval consumed in awaiting the proper cooling of the record.

Other objects of this invention will appear in the specification and claims below.

Referring to the drawings forming a part of this specification and in which the same reference characters are used throughout the various views to designate the same parts—

Figure 1 is a side elevation of the completely assembled pressing machine, partly broken away at several points to more fully disclose its constructional features.

Fig. 2 is a sectional view, drawn to a somewhat larger scale, and partly in side elevation, showing the central column of the machine, and also showing the complete arrangement of piping, together with the automatic valve-actuating mechanism therefor, for one of the plurality of identical pressing units.

Fig. 3 is a plan view from above, of a portion of one of the tilting-head pressing units, also showing the complete piping connections thereto.

Fig. 4 is an enlarged detail in side elevation of the automatically-actuated valve mechanism which controls the flow of the heating and cooling media to each press in proper synchronism with its various operations.

Fig. 5 is a similarly enlarged detail, also in side elevation, of the automatically-actuated valve mechanism which controls the flow of water used as power to actuate each press in proper synchronism with its various operations.

Fig. 6 is a side sectional view, taken through the center-line vertical plane, of one of the plurality of presses in open position.

Fig. 7 is a similar view of the same press in closed or pressing position.

Fig. 8 is a side elevation of the driving system, showing the electric motor driving a beveled pinion through a reduction gear, which pinion meshes with an annular rack on the under side of the rotating conveyor or table.

Fig. 9 is a diagrammatic view, in semi-section and side elevation, to illustrate the three operating positions of the valve mechanism which controls the periodic admission of the heating and cooling media to the presses, and showing also the automatic manner of actuating this valve in proper synchronism with the press operations.

Figs. 9^A, 9^B, and 9^C are semi-sectional views of the valve structure itself, shown in the three operating positions, A, B, and C, respectively, of Fig. 9.

Fig. 10 is a similar diagrammatic view to Fig. 9, but showing the two operating positions, A and B, of the hydraulic valve which controls the water pressure used to furnish power to actuate the presses.

Fig. 11 is a semi-complete plan view from above of the entire machine, to illustrate the plurality of pressing units in mounted relation on the conveyor top, and also the positions of the charging and discharging tables relative to the complete machine.

Figure 12:
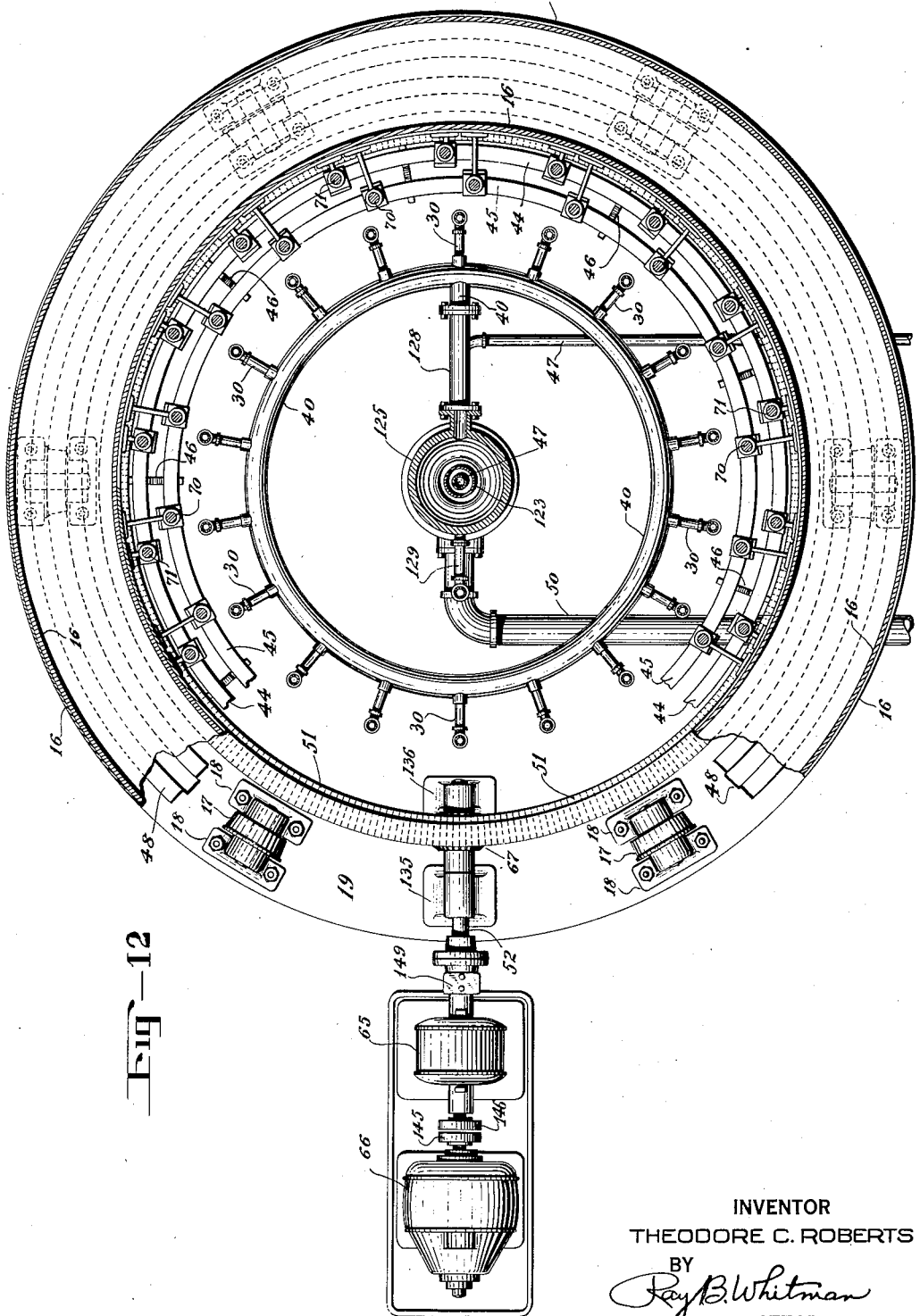

Fig. 12 is a top plan view of the base of the machine, with the conveyor and upper structure removed, to show the location of the rotary supports for the revolving conveyor, the position of the driving system, the valve-operating cam rails, and the media distributing system in the lower or base portion of the apparatus.

Figure 13:
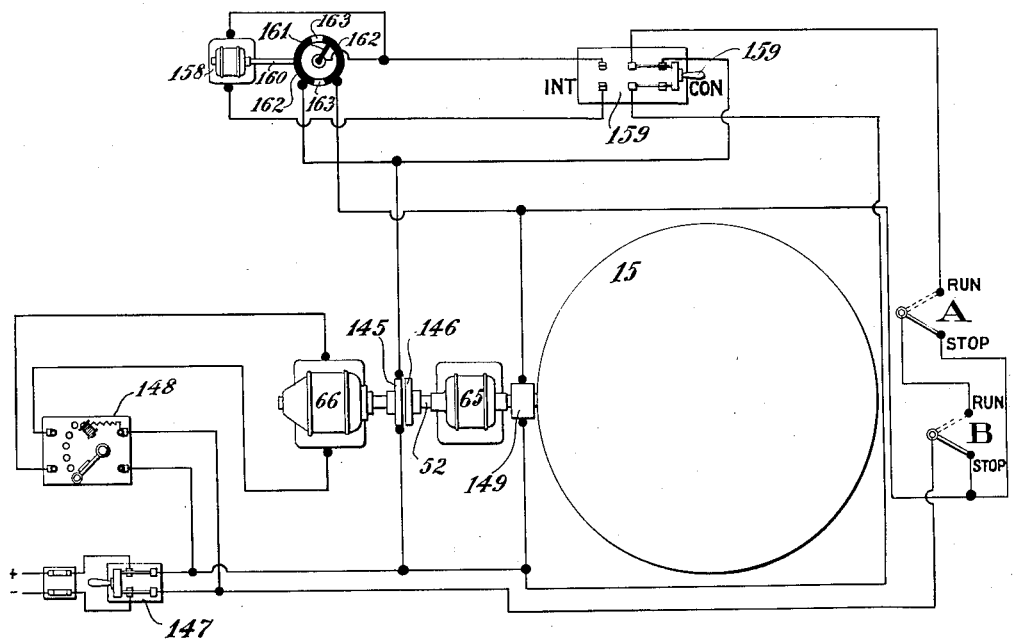

Fig. 13 is a wiring diagram of the electrical connections, to show how either the charging or discharging operator can instantly stop the apparatus by opening the circuit to the magnetic clutch connecting the driving motor and apparatus, and which also applies the solenoid brake. This view also shows a means whereby either a continuous or intermittent motion of the conveyor may be effected.

Figure 14:
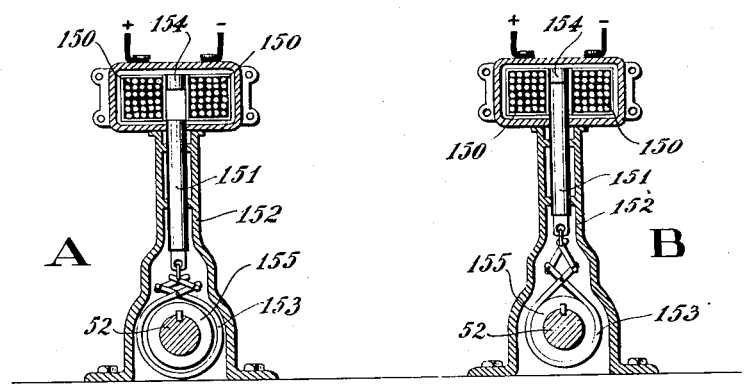

Fig. 14$^A$ is a sectional view, in non-braking position, of the solenoid brake, which operates simultaneously with the magnetic clutch to enable either operator to instantly stop the machine at will.

Fig. 14$^B$ is a similar view, showing the brake in operating or braking position.

Broadly speaking, the apparatus comprises a plurality of presses, numbered from 102 to 119, Fig. 11, rigidly mounted on the top 15 of a conveyor 16, revolving about its vertical axis. This conveyor is provided with a track 48, Figs. 1 and 2, on its lower peripheral edge, on which it is rotatably supported by rollers 17 mounted to revolve freely in bearing supports 18—18, which supports are suitably secured to the base 19 of the apparatus at equidistant intervals around the periphery of said base, as shown in Fig. 12. Base 19 is securely mounted on a concrete foundation 58.

The conveyor 16, shown in section in Fig. 8, is driven through an annular toothed rack 51, secured to its under surface near the outer edge thereof, said rack meshing with a driving pinion 67 driven by shaft 52. This shaft 52, mounted in bearings 135 and 136, is caused to rotate by means of an electric motor 66, through proper reduction gear 65, in the manner illustrated.

In the embodiment disclosed, the conveyor consists of a horizontal table, circular in outline, and some 16 to 18 feet in diameter, and having a top-plate 15 with its center removed—as shown at 142 in Figs. 2 and 11—to provide access to the distinguishing apparatus and its piping connections; top-plate 15 is rigidly secured along its outer area to an annular-shaped box-girder construction 16, which girder 16 mounts the plurality of presses, 102–119 inclusive, in uniformly-spaced relation around the outer edge of the top-plate 15. Stiffeners or structural braces 74, Fig. 2, serve to strongly combine the girder and the central or hub portion of the machine.

The pressing unit shown is what is known as the "tilting-head" type; that is, the lower face of the press is hinged in relation to the upper face, and moves to and from said upper face along an arc-shaped path. The details of construction of this press are illustrated in Figs. 6 and 7, which show a support 13 rigidly secured to the conveyor-top 15 and on which the press itself is rigidly mounted.

Fig. 6 shows the press in open position, ready to receive a quantity of record stock preparatory to pressing out a record. The stock is placed upon the lower or movable matrix 35 which is mounted on its press head 36. This lower matrix 35, when manufacturing double-faced records, carries tone-lines on its surface the same as does the upper matrix 34. Hydraulic valve 27 is now automatically actuated in the manner hereinafter explained in detail, and the pressure of the entering water against the head of piston 33 forces it upwardly in cylinder 59 in the direction of the arrow, Fig. 6. This movement lifts the lower head 36 with its matrix 35 by means of the connecting rods 32, which rods pivotally connect the upper and lower press platens in the manner illustrated.

Fig. 7 shows the press in closed or pressing position, hydraulic pressure having been admitted through pipe 69, and forcing piston 33 with its piston head 31 sliding in guide-support 68 to the top of its stroke, carrying with it the lower platen matrix 35 into near-contact with upper matrix 34.

In connection with the operation of the press, there is provided automatically-actuated valve mechanism, later described in detail, for introducing heating and cooling media to the press platens at the proper stage in the manufacture of the record. This media enters through flexible tubing 79, Figs. 6 and 7, connecting the steam valve 28 and cold water valve 29 with the press platens 34 and 35, the discharge for both the condensed steam and cooling water being through flexible tubing 78 and pipe 30.

The operation of the apparatus is best understood by reference to Fig. 2. The heating medium—in this case, steam, and designated by "S"—is introduced into the apparatus through the steam distributing nozzle 25 which is stationarily mounted above the machine in the position shown. A steam-tight joint 120 placed between the distributing nozzle 25 and its pipe connection 121 allows the latter to revolve freely, this connection 121 being integral with the steam inlet pipe 24, which is rigidly mounted on, and revolves with, the conveyor 15—16. The steam passes through nozzle 25 and connection 24 into the circular steam header or manifold 22. This manifold 22 is a continuous pipe passing around the conveyor and mounted above the conveyor-top 15 in suitable pedestals or brackets 61, 62, 63, and 64 (see Fig. 11); in the same brackets are also mounted similar manifolds 21 and 23, carrying the incoming hydraulic water and the cooling water, respectively.

From manifold 22 a plurality of branch connections 54, Fig. 3, extend radially to the automatically-actuated steam valve 28, which, when opened, allows it to pass through flexible tubing 79 to spaces or jackets in the press platens. By this means the platens are heated and from them also their matrices, and also—to a greater or lesser extent—the record-stock placed thereon.

After the steam has performed its heating function, it is discharged through flexible tubing 78 and pipe 30 connecting each pressing unit with the discharge manifold 40 which carries off the waste cooling water and condensed steam; manifold 40 is circular in outline and mounted on a number of equi-spaced supporting brackets 75. This condensate passes out through discharge pipe 128, designated also by "W. S. & C.," into a central distributor 125, through which it flows downwardly in the direction of the arrows, and finally out through a connection 139, shown by dotted lines in Fig. 2, either to the sewer or to an accumulation tank.

The cooling water enters through connection 50, shown near the base of the central column in Fig. 2, said connection being rigidly secured to a lower or base distributing column 122, which is rigidly mounted in a suitable foundation. Passing upward in the direction of the arrows through a stand-pipe 123, rigidly secured to said column 122, it is finally released through suitable escape holes 124, and passes into a distributing nozzle 38, which nozzle and its piping connections are rigidly secured by means of suitable braces 56 to distributor 125 and revolves with it and the conveyor on a ball-bearing or other anti-friction base 126, on top of column 122, and around stationary stand-pipe 123, being arranged with a steam-tight joint by means of suitable packing glands 130. The cooling water then passes out from this nozzle 127 through a connection 57, Fig. 3, to manifold 23, from which it is distributed to the plurality of presses, 102–119 inclusive, through radially-disposed pipe connections 55, control valve 29, and flexible tubing 79.

The waste cooling water, after performing its cooling function in the presses, is discharged with the condensed steam through tubing 78, pipe 30, manifold 40, discharge pipe 128, distributor 125, and out through connection 139.

The hydraulic pressure "H," used to actuate the presses, enters through pipe connection 47 near the bottom of the lower or base column 122, and passes upward in the direction of the arrows through this pipe, which is positioned inside of the stand-pipe 123, as shown in Fig. 2. A water-tight anti-friction joint 156 connects this stationary pipe 47 with its connecting pipe 26 which revolves with the press and supplies the hydraulic manifold 21, from which each press is fed through a radially-disposed connection 53 through its valve 27 and supply pipe 69.

The discharge for the hydraulic line "W. H." is through radial connection 95 to circular manifold 60—which is supported from the under side of top 15 by bracket 76—and out through connection 129 into and through a connecting chamber 140 in the coacting distributors 125 and 122, and finally out through exit pipe 49.

The mechanism for automatically-actuating the valves which control the admission and discharge of the heating and cooling media in proper synchronism with the operations of the press, includes a circular cam rail 45 mounted on pedestals 46 attached to the base 19 of the apparatus, as shown in Figs. 2 and 12. The operation of this mechanism may be best understood from the diagrammatic views in Fig. 9. This shows the cam rail 45 at all three operating heights with the valve mechanism operated at each position. In Fig. 9, position A shows a cam-rod roller 131 mounted at the lower end of cam-rod 70, which rod moves vertically in its bearing supports 73 and 141, as roller 131 moves with the conveyor 16 over cam-rail 45. In this position the cooling water passes from the manifold in the direction of the arrows through connections 55 and 99, Fig. 4, out through flexible tubing 79 to the pressing unit, valve 28 closing off steam connection 54 while in this position. In Fig. 9ᴬ, which shows how this is effected, cooling-water valve 29 has been raised off its seat by a collar 98, rigidly attached to the upper end of cam-rod 70, pressing down one end of lever 101, which lever is pivotally held at or near its center point by support 100; its other end, thus caused to move in an opposite direction, is positioned between collars attached to the valve spindle, and so raises the valve off its seat by means of said spindle.

In the second position, shown at B, Fig. 9, the roller with its cam-rod has moved upward on the rail—due to the rotation of the conveyor 16 to which it is attached—to the position shown. This compresses spring 133, and raises the rod 70 and with it the rigidly-attached collar 98, which movement permits valve 29 to drop back upon its seat; both valves are then closed, as shown in Fig. 9ᴮ, and both steam and water prevented from passing through.

In the third position, shown at C, Fig. 9, the roller 131 with its rod 70 has moved to the top position. Collar 98, Fig. 9ᶜ, has pushed up lever 97, pivoted to support 96 and carrying valve 28, which valve is raised off its seat, the valve 29 being still seated. Steam then enters through connection 54 and passes upwardly in the direction of the arrows and out to the press through flexible tubing 79, while cooling-water valve 29 remains closed.

The hydraulic line, the pressure of which is used to operate the presses, is automatically-controlled in a similar manner, as shown in Figs. 5 and 10, which disclose a cam rail 44 at the two operating heights, and a roller 132 mounted on the end of cam-rod 71, which rod slides vertically in bearings 72 and 143 and carries with it a lever 77 which actuates the valve as shown. Here position A shows the roller riding on the highest part of rail 44, in which position the water discharges from press connection 69 downward in the direction of the arrows through connection 95 to discharge manifold 60 (Fig. 2) and finally out through connection 129, chamber 140 and discharge line 49. Position B shows the roller in its lowest position, in which the water enters through connection 53 and passes through connection 69 to the press.

Roller 131, carrying its rod and valve mechanism, is forced downward on the rail 45, as the rotation of the apparatus carries it from a high to a low position on the rail, by means of compressed spiral spring 133. This spring is mounted over rod 70 between a collar integral thereto and a part integral with the relatively stationary press structure, such as the end of upper bearing 141. Likewise, roller 132 of Fig. 10 is kept on the rail 44 by means of spiral spring 134, similarly positioned.

In the operation of the apparatus, it is necessary that both the charging and discharging operator have complete control over the movement of the conveyor. To this end, there is provided, between the electric motor 66 and reduction gear 65, a magnetic clutch 145—146 in circuit as shown in the wiring diagram, Fig. 13. This clutch, magnetizing part 145 of which is mounted on the motor shaft end, and magnetized part 146 on the end of shaft 52, is arranged, as shown, to be operated by snap switches or other convenient means from either position A or B, these positions corresponding to the positions of the charging operator near 137, Fig. 11, and the discharging operator near 165, respectively. In this manner, either operator can open the circuit to stop the conveyor, which cannot again be started until the same operator has closed his switch.

In connection with this control mechanism there is provided an electrical solenoid brake 149, Fig. 13, arranged to operate simultaneously with the magnetic clutch 145—146 on the opening of the circuit at either point A or B. The operation of this brake is disclosed in Fig. 14, wherein A represents a side sectional view of the brake structure in the open or non-braking position, and B shows the same view in braking position. This structure comprises a solenoid or hollow magnetic coil 150, a magnetizable plunger 151, mounted in a casing 152, and whose upper end is normally at the lower edge of the coil, as shown, but is arranged to be drawn upwardly into the core of magnet 150 and against magnetized stop 154 when said magnet is energized by means of an electric current; a brake band 153 is attached to the lower end of the plunger 151, and encircles a brake collar 155 mounted on, and keyed to, the driving shaft 52, in such a way as to grip around the peripheral surface of the collar 155 when current is passed through the solenoid. Thus, magnetic attraction forces upwardly the plunger 151, carrying with it the ends of the brake band, and so operating the brake to instantly stop the machine.

This solenoid brake 149, Fig. 18, is connected up, as shown, so as to operate simultaneously with the magnetic clutch 145. When one of the operators, either at position A or B, opens the switch, this clutch is disconnected, allowing the motor 66 to run free of the driving shaft 52, and at the same time brake 149 acts against collar 155 on this shaft, thus causing the machine to stop instantly. On the other hand, when the switch is again closed the clutch acts, and simultaneously the brake releases.

In some cases it may be found desirable to provide for the intermittent motion of the conveyor, instead of for continuous motion, as here described. For that purpose, there is shown in the diagrammatic view of Fig. 18, an apparatus consisting of a small electric motor, 158, arranged to revolve continuously when line switch 159 is thrown into the intermittent running position, marked "Int.". This motor rotates a shaft 160, which, through suitable reduction gear—not shown—causes a conduction arm 161 to revolve slowly about two conducting semi-circular segments 162 separated by non-conducting segments 163. These segments 163 are made slightly longer than the width of revolving arm 161 to prevent arcing across. This apparatus is wired, as shown, so that when switch 159 is at position marked "Int.," the pressing machine will start and stop intermittently, through periodically magnetizing and demagnetizing the magnetic clutch 145—146, thereby providing for starting control through slippage at this clutch; and when this switch is in position marked "Con.," continuous operation will take place.

This apparatus is thus made to automatically start and stop the conveyor at periodic intervals. It may be here noted, however, that since each pressing unit in its entirety is mounted on the conveyor, this is not required from considerations of pressing, but only as a possible aid in charging and discharging.

The driving motor 66 is started by means of line switch 147 and starting rheostat 148 with its no-voltage release coil.

The details of construction and operation of the matrix and die plate, with the necessary automatic record-ejecting mechanism, are not shown in this application but are a part of a divisional application.

The operation of the complete machine is as follows:

Line switch 147, Fig. 13, having been thrown in, electric motor 66 is advanced to running speed by means of starting rheostat 148. Snap switches at positions A and B having been previously closed or put into "Run" position, magnetic clutch 145—146 acts to connect motor 66 with reduction gear 65, which gear is directly connected through shaft 52 to driving gear 67 (see Fig. 8); solenoid brake 149 is meanwhile in inoperative or non-braking position, as shown in section in Fig. 14ᴬ. In this manner, the conveyor 16, carrying its plurality of identical pressing units 102–119, is advanced to running speed.

A quantity of record stock, which may or may not be preheated, is placed on the lower platen of the open press, as, for example, press 113, Fig. 11, by the charging operator, with the aid, preferably, of a charging magazine 137 placed, as shown, between the press and a charging conveyor 164. If it is desired to preheat the record stock before its introduction to the press, and not depend entirely on the heating system incorporated in the press, the charging magazine can be arranged to deliver its product so heated, this merely involving the addition of a chamber heated by steam or otherwise, in connection with the magazine. The magazine top may be at any height, in relation to the lowest or open position of the lower press platen, which is most convenient to load from, it being here illustrated as at practically the same level.

Steam has previously been admitted to the press platens by the mechanism already described in detail and illustrated in Fig. 9, so that the matrices are heated and ready for the record stock. A label, or labels, having been previously applied, the rotation of the conveyor now operates the hydraulic line, actuated by the cam-rail mechanism shown, the pressure in which line closes the press platens under a pressure of some 2700 pounds, more or less. Press 113 on conveyor 16 has progressed but a short distance around its circular path when this pressing operation has been completed, at which time, in the manner already detailed, the automatic mechanism shuts off the steam supply and turns on the cooling water supply to the press platens.

During the balance of the rotation to discharging position at the press-end of discharging conveyor 165 this cooling action continues, and since the relative location of the charging and discharging stations, and the time interval consumed in moving each pressing unit between these two points, may be regulated at will, it is thus apparent that any cooling interval needed may by this arrangement be provided for, and without interruption to the operation of the machine. For the conveyor may be constructed of any desired diameter, any number of pressing units may be mounted thereon, the speed of rotation may be varied, or the relative distance between the charging and discharging points altered, as required. Also, the location of the various operating heights of the two controlling cam-rails, and with it of the respective operations of admission and discharge of heating, cooling, and hydraulic lines, may be varied to suit any given set of conditions.

When press 113 has traveled with the conveyor around the circular path in the direction of the arrows, Fig. 11, finally reaching a position opposite discharging conveyor 165, the cooling water automatically shuts off and hydraulic discharge opens, in the manner hereinbefore explained. The lower platen of the press drops downward by gravity, forcing out the hydraulic discharge. The pressed and cooled record is now removed from the press by the discharging operator, after which the cooling water automatically shuts off and the steam is turned on. By the time press 113 reaches the position of the charging magazine 137, the steam passing through the press platens has again heated up the matrices, which are now ready to receive the next charge of heated record stock. Tables 166 and 167 are provided for the convenience of the charging and discharging operators.

This completes the cycle of operations of press 113, which is repeated continuously as long as the apparatus is running. It is, of course, understood that each one of the identical presses 102–119, inclusive, operates successively and simultaneously through the same cycle as that just described for press 113. In this way, although it may require a minute and a half to press a record from the time it is charged at station 137 until its removal by the discharging operator on conveyor 165, yet, with a machine containing 18 presses as shown, a record is completed every five seconds, and two men only are needed to accomplish this. Moreover, the machine being entirely automatic, the quality of the records made is not only absolutely uniform, but far superior to that produced by present means, since each contributing factor can be exactly and permanently controlled.

While the invention has been described as embodied in a machine especially designed as a press for manufacturing disc sound records for graphophones and the like, it is to be expressly understood that the invention is not restricted to employment in such a type of machine, but may be used where thermoplastic or other material is formed in a press with the aid of heating or cooling—or combined heating and cooling—operations, or other successively performed steps or operations in the manufacture of pressed articles. Furthermore, while the invention has been shown as employing a definite number of a particular type of pressing unit, it is understood that any other number of this or some other type of pressing unit may be employed, necessitating only minor or easily-apparent changes in the constructional features of the remainder of the apparatus. This applies throughout the apparatus, wherein equivalent parts may be substituted for those shown without departing from the spirit of the invention. Yet again, certain features of the invention are capable of use without other features of the invention, as will be readily apparent to those skilled in the art. In short, this invention is not limited to the specific disclosure, but includes all of the modifications coming within the scope of the appended claims.

Having thus set forth the nature of the invention, what is claimed herein is:

1. A multiple pressing machine, comprising a conveyor and including cooperating platens adapted to have relative automatic movement between them to expose both faces in the open position of the press carrying a plurality of identical tilting-head pressing units in which the record material is treated in its various stages simultaneously.

2. A multiple pressing machine, comprising a conveyor and including cooperating platens adapted to have relative automatic movement between them to expose both faces in the open position of the press carrying a plurality of identical tilting-head pressing units in which the record material is treated in its various stages simultaneously, these various stages being performed successively and in the one machine.

3. A multiple pressing machine, comprising a conveyor revolving about a vertical axis, said conveyor carrying a plurality of identical tilting-head pressing units in which the record material is treated in its various stages, these stages being performed successively and in the one machine.

4. In an apparatus for making pressed articles, means for controlling the flow of heating and cooling media to each pressing unit, comprising a cam rail having a plurality of elevations, a cam rod roller, a cam rod which is arranged to move vertically in bearings attached to the revolving conveyor, said vertical movement of the cam rod actuating mechanism which opens and closes said valves for the admission and discharge of the heating and cooling media.

5. In combination with the revolving conveyor of an apparatus for pressing articles, an annular rack on the under periphery of the conveyor, a driving and controlling system comprising an electric motor, suitable reduction gearing through which said motor is adapted to drive said annular rack, and electrically operated means for controlling the movement of the conveyor from a plurality of points.

6. The invention as in claim 5, the controlling means comprising electrical switches, a magnetic clutch, and a solenoid brake on the driving shaft so wired that opening any one of said switches will both disconnect said magnetic clutch and apply said solenoid brake on the driving shaft.

7. The invention as in claim 5, the controlling means comprising electrical switches, a magnetic clutch, and a solenoid brake on the driving shaft so wired that opening any one of said switches will both disconnect said magnetic clutch and apply said solenoid brake on the driving shaft, the solenoid brake being arranged between the reduction gear and the driving gear.

8. In combination with an apparatus, a conveyor, a driving and controlling system comprising an electric motor having a driving shaft adapted to drive said conveyor substantially at its periphery, suitable reduction gear placed in the driving shaft, and means for controlling the movement of the conveyor from a plurality of points.

9. The invention as in claim 8, the means comprising a magnetic clutch, a solenoid brake, and electrical switches so wired that any one will both disconnect the magnetic clutch and apply the solenoid brake.

10. The invention as in claim 8, the means comprising a magnetic clutch, a solenoid brake, and electrical switches so wired that any one will both disconnect the magnetic clutch and apply the solenoid brake, the solenoid brake being arranged between the reduction gear and the driving gear.

11. In a multiple pressing apparatus, electrical means for starting and instantly stopping the operation of the apparatus, said means including a rack and a motor-driven pinion, a main driving shaft driven thereby, suitable reduction gear, a magnetic clutch between the motor and reduction gear, an electrically-operated brake between the reduction gear and the main driving pinion, and a switch so arranged in circuit that when opened it will disconnect the driving motor from the driven apparatus at the magnetic clutch and simultaneously apply the brake.

12. In a multiple pressing apparatus, electrical means for starting and instantly stopping the operation of the apparatus from more than one position, such means comprising an electric motor, a main driving shaft driven thereby, a reduction gear, a magnetic clutch between the motor and reduction gear, an electrically operated brake between the reduction gear and the main driving pinion, and a plurality of switches disposed at different stations about the machine and so arranged that the opening of any one will disconnect the driving motor from the driven apparatus at the magnetic clutch and simultaneously apply the brake.

13. The combination in a multiple pressing apparatus, of a conveyor, a driving motor, and electrically controlled means operating on the circuit of the driving motor for causing a continuous and an intermittent motion of the conveyor, at will.

14. The invention as in claim 13, said means comprising a plurality of contact segments, a continuously revolvable conducting arm in moving contact with said plurality of contact segments, insulated segments somewhat wider than the arm and separating said contact segments, and a two-way switch in circuit, substantially as shown in Fig. 13.

15. The combination in a multiple pressing apparatus, of a conveyor, a driving motor, a magnetic clutch, and electrically controlled means operating on the circuit of the driving motor for selectively causing a continuous and an intermittent motion of the conveyor, at will, said means comprising a plurality of contact segments, a continuously revolvable conducting arm in moving contact with said plurality of conducting segments, insulated segments somewhat wider than the arm and separating said contact segments, and a two-way switch so arranged in the circuit that when the switch is thrown into intermittent running position, the conducting arm closes the circuit through the magnetic clutch when said arm is in contact with the conducting segments, and opens it when it is in contact with the insulating segments, and when the switch is in continuous position this intermittent arrangement is thrown out of circuit, and the driving motor is directly in circuit.

16. In combination with the revolving conveyor of a multiple pressing machine, electrical means for causing movement of the conveyor, comprising a plurality of conducting surfaces, separating insulating surfaces, a conducting arm in moving contact both with said plurality of conducting surfaces and with their separating insulating surfaces, and a two-way switch in circuit substantially as shown in Fig. 18.

17. The invention as in claim 16, said insulating surfaces being wider than the conducting arm.

18. In combination with the revolving conveyor of a multiple pressing machine, a driving motor, electrically controlled means operating on the circuit of the driving motor for selectively causing a continuous and an intermittent motion of the conveyor, said means comprising a plurality of conducting surfaces, separating insulating surfaces, a conducting arm in continuous moving contact with said plurality of conducting surfaces, and with their separating insulating surfaces, said insulating surfaces being wider than the conducting arm, and a two-way switch in circuit substantially as shown in Fig. 13.

19. In combination with the revolving conveyor of a multiple pressing machine, a driving motor, a magnetic clutch, electrically controlled means operating on the circuit of the driving motor for selectively causing a continuous and an intermittent motion of the conveyor, said means comprising a plurality of conducting surfaces, separating insulating surfaces, a conducting arm in continuous moving contact both with said plurality of conducting surfaces and with their separating insulating surfaces, said insulating surfaces being wider than the conducting arm, and a two-way switch so arranged in circuit that when the switch is thrown into intermittent running position the conducting arm closes the circuit through the magnetic clutch when said arm is in contact with the conducting surfaces, and opens it when it is in contact with the insulating surfaces, and when the switch is in continuous position, this intermittent arrangement is thrown out of circuit.

20. In a multiple pressing apparatus, a conveyor, a magnetic clutch, a solenoid brake, and electrical means for selectively causing a continuous or an intermittent motion of the conveyor at will, said means comprising automatically-operated circuit opening and closing devices so arranged in the main circuit that, when opened, the magnetic clutch will be out of circuit and the solenoid brake in circuit; and, when closed, the magnetic clutch will be in circuit and the solenoid brake out of circuit.

21. A pressing unit including a stationary upper platen and a movable lower platen hingedly arranged to move upwardly against the upper platen by hydraulic pressure.

22. A pressing unit including a diagonally-positioned stationary upper platen and a movable lower platen hingedly arranged to move upwardly against the upper platen by hydraulic pressure.

23. A pressing unit including an upper press head, a stationary upper platen, a movable lower platen hingedly arranged to move upwardly against the upper platen, and hydraulic means arranged within the upper press-head, adapted to move said lower platen relative to said upper platen.

24. A pressing unit including an upper press-head, a stationary upper platen and a movable lower platen hingedly mounted on the press, a hydraulically-actuated piston arranged in the upper press head, and a piston rod connecting said movable platen to said piston.

25. A pressing unit including a press-head, a movable platen, fluid pressure means carried by said press-head adapted to move said movable platen relative to said press-head and a stationary platen arranged between said press-head and said movable platen, and adapted to co-operate with said movable platen.

26. The combination in a tilting-head press of upper and lower platens, means for raising the lower platen up against the upper one and applying pressure thereto for pressing the record, and means for heating and cooling the platens, each of said means being automatically controlled in proper sequence.

27. The combination in a tilting-head press of an upper stationary platen, a lower movable platen, and means adapted to both swing said lower platen into position against the upper stationary platen and press the same thereagainst in one operation.

28. The invention as in claim 27, said means being actuated by fluid pressure.

29. The invention as in claim 27, together with valve mechanism automatically operated for both actuating said means and controlling the flow of heating and cooling media to said press platens.

Signed at Bridgeport, in the county of Fairfield and State of Connecticut, this 11th day if August A. D. 1920.

THEODORE C. ROBERTS.